United States Patent Office 3,801,554
Patented Apr. 2, 1974

3,801,554
LITHIUM ALKENOXIDES AS MODIFIERS IN ORGANOLITHIUM INITIATED POLYMERIZATION
Charles M. Selman, Bartlesville, Okla., assignor to Phillips Petroleum Company
No Drawing. Filed Feb. 28, 1972, Ser. No. 230,099
Int. Cl. C08d 1/32; C08f 19/08
U.S. Cl. 260—83.7
14 Claims

ABSTRACT OF THE DISCLOSURE

Addition of lithium salts of alkenols to polymerization systems initiated with lithium based initiators results in polymers with broadened molecular weight distribution and hence with improved processability.

FIELD OF INVENTION

This invention relates to the polymerization of conjugated dienes and of vinyl aromatic compounds. In another aspect, the invention relates to a method of modifying organolithium initiated polymerization systems.

BACKGROUND OF THE INVENTION

Organolithium including multilithium initiator systems are used extensively in polymerization systems for polymerizing conjugated dienes alone, or with vinyl-substituted aromatic monomers. However, methods of preparing polymeric products with broadened molecular weight distribution are to be desired.

Polymers of broadened molecular weight distribution tend to have more desirable processing characteristics such as better banding on a roll mill, faster and better mixing of compound recipes in an internal mixer, faster and smoother extrusions, and generally reduced cold flow.

OBJECTS OF THE INVENTION

It is an object of my invention to modify organolithium initiated polymerization processes to broaden molecular weight distribution of the resulting polymer.

A further object of my invention is to provide a novel modifier system for organolithium initiators for conjugated diene polymerization processes.

SUMMARY OF THE INVENTION

Polymerization reactions initiated with organolithium initiators can be modified effectively by using lithium salts of alkenols. The polymer resulting from the process employing my modifying agents has a broadened molecular weight distribution compared to polymers produced from systems not employing my modifiers.

The improved properties extend not only to the polymers produced with organolithium initiator systems, but also to the coupled polymers prepared by treating the unquenched organolithium polymerization system with various polyfunctional terminating and coupling agents.

DETAILED DESCRIPTION OF THE INVENTION

The modifiers, lithium salts of alkenols, also termed lithium alkenoxides, suitable for use in the process of my invention can be represented by the general formula:

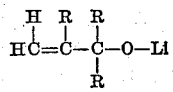

in which each R is hydrogen or is a hydrocarbyl radical having from 1 to 8 carbon atoms such as alkyl, cycloalkyl, aryl, or combination thereof such as alkaryl, aralkyl, alkylcycloalkyl, and the like.

Examples of such lithium alkenoxides include the lithium salts of alyl alcohol; methallyl alcohol; 1-penten-3-ol; 3-buten-2-ol; 2,3-dimethyl-3-buten-2-ol; 1-undecen-3-ol; 1,1-diphenyl-2-propen-1-ol; 2-phenyl-2-propen-1-ol; 3-phenyl-1-penten-3-ol; 1-hexen-3-ol; 3,4,4-trimethyl-1-penten-3-ol; 2,6-dimethyl-1-octen-3-ol; 2-benzyl-1-phenyl-3-buten-2-ol; 2-cyclopropyl-3-buten-2-ol; and the like.

The lithium salts of the above alcohols can be prepared by simply contacting the corresponding alcohol with finely divided lithium metal or with a hydrocarbyllithium compound such as n-butyllithium or phenyllithium. It is also within the scope of this invention to form the lithium alkenoxide modifier in situ by adding a suitable olefinic alcohol to the polymerization mixture containing an organolithium initiator, in the presence or absence of the monomers to be polymerized, but most conveniently in the presence of the polymerization diluent. Since a portion of the initiator is thus consumed in forming the lithium alkenoxide. Allowance for this can be made by adjusting the amount of the organolithium initiator charged to the polymerization mixture.

MODIFICATION OF LITHIUM ALKENOXIDE

A single lithium alkenoxide modifier can be used, or mixtures with two or more can be employed, if desired. The lithium alkenoxide, one or more, can be added to the polymerization reaction mixture in any desired order relative to the other components employed, that is, the monomer or monomers to be polymerized, the diluent, and the initiator.

When performed the lithium alkenozide can be prepared and employed in an inert hydrocarbon diluent as a suspension or dispersion therein. Suitable diluents include those typically employed in the polymerization itself, such as pentane, cyclohexane, benzene, toluene, dodecane, and the like.

It is presently preferred, since it is believed that the effect will be most efficient, to add the lithium alkenoxide modifier to the polymerization reaction mixture at the beginning of or near the beginning of the polymerization reaction. However, when desired, the lithium alkenoxide can be added to the polymerization reaction during the course of the polymerization reaction, although it will be readily apparent that for effective modification it is necessary that the modifier be added to the polymerization system before all of the monomer or monomers to be polymerized have been completely polymerized.

As can be realized, conditions for employment of the lithium alkenoxide modifier, such as the temperature, pressure, and the like, will be those of the polymerization process itself. The lithium alkenoxide modifier can be added, in effect, all at once, or initially in part, and subsequently in further part, or in various increments, as may be desired or convenient for producing various effects in the finally produced modified polymer of broadened molecular weight prepared according to the process of my invention.

RATIO OF ORGANOLITHIUM INITIATOR TO LITHIUM ALKENOXIDE

The amount of lithium alkenoxide modifier employed can be expressed in terms of the ratio of equivalents of lithium in the organolithium initiator to equivalents of lithium alkenoxide. This ratio can vary widely, depending, for example, on whether the modifier is to be added as such, or formed in situ, as well as on the type of lithium initiator employed and the polymer modification desired. A reasonable range can be from 0.1:1 to 2:1, while preferably, from the standpoint of maximum effect on molecular weight distribution while still obtaining high conversion, in the range of 0.2:1 to 0.5:1.

POLYMERIZABLE MONOMERS

The monomers which can be polymerized in the process of my invention are those known to the art which are polymerizable with organolithium initiators in general.

The polymerizable monomers can be selected from any of the polymerizable conjugated dienes, such as those having 4 to 12 carbon atoms per molecule; more usually for commercial purposes those having 4 to 8 carbon atoms per molecule; as well as from any of the polymerizable vinyl-substituted aromatic compounds, such as those of 8 to 20 carbon atoms per molecule, more usually for commercial purposes those of 8 to 12 carbon atoms. Homopolymers of the conjugated dienes can be prepared, or copolymers of any two or more thereof, prepared by polymerization in admixture, or by sequential addition; or copolymers of conjugated dienes with vinyl-substituted aromatic compound, one or more of each, polymerized alone or in admixture, or by any sequence of addition; by methods of preparation well known for use with organolithium initiator systems.

Presently preferred monomers include 1,3-butadiene, isoprene, styrene, 1-vinylnaphthalene, 4-tert-butylstyrene; as well as 2,3-dimethyl-1,3-butadiene, 3-butyl-1,3-octadiene, 2-phenyl-1,3-butadiene, 3-methylstyrene, 4-cyclohexylstyrene, 4-dodecylstyrene, 2-ethyl-4-benzylstyrene, 4-isopropylstyrene, and the like.

POLYMERIZATION CONDITIONS

Polymerization temperatures and pressures employed for such polymerization systems can vary widely, as is well known in the art. Typically, polymerization temperatures can be from about $-50°$ C. to $+200°$ C., frequently from $-10°$ to $+75°$ C. Pressures employed typically are at least sufficient to maintain a substantial portion of the reaction mixture in a liquid phase. Polymerization reactions are conveniently carried out in the presence of a suitable diluent, such as inert hydrocarbon compounds of 4 to 12 carbon atoms per molecule, or mixtures thereof. Diluents described relative to preparation of the lithium alkenoxide modifiers can suitably be employed in the polymerization system itself. Reaction times for the polymerization can vary over a wide range, often depending on other polymerization reaction parameters. It is presently preferred for efficiency in such polymerizations that the overall parameters be selected such that essentially complete conversion of monomer or monomers to polymer is obtained.

ORGANOLITHIUM POLYMERIZATION INITIATORS

The term organolithium initiators is intended to be of broad reference in the context of my invention. Any of the organolithium polymerization initiators known in the art are suitable for use in this invention.

Suitable initiators include those represented by the general formula $R'(Li)_x$ wherein $R'$ is an aliphatic, cycloaliphatic, aromatic, or combination, hydrocarbon radical, and $x$ is an integer of 1 to 4. The $R'$ group has a valence equal to the integer $x$ and preferably contains from 1 to 20 carbon atoms. Examples include n-butyllithium; sec-butyllithium; phenyllithium; eicosyllithium; 1,8-dilithio-3-decene; 1,3,5-trilithiocyclohexane; 1,3,5,8-tetralithiodecane; and the like.

Other suitable organolithium initiators include the reaction products, often termed adducts, of lithium metal with polyaryl-substituted ethylenes such as stilbene; and also the reaction products or adducts of lithium with fused ring aromatic hydrocarbons such as 1-methylnaphthalene. Also suitable are the multilithium initiators prepared by the reaction of organomonolithium compounds with polyvinyl aromatic compounds such as divinyl benzene, and the like. Any other of the organolithium initiators also are suitable.

The amount of organolithium initiator employed for the polymerization can vary over a wide range, depending, for example, on the type of polymer desired, i.e., low or high molecular weight polymer. A typical range of initiator would be from 1 to 20 gram milliequivalents of lithium in the initiator per 100 g. of monomers to be polymerized.

TERMINATION

Where desired, coupling or branching agents can be added to the polymerization reaction system in order to couple thereby the active polymerlithium moieties to form radial or branched polymers. Coupling agents such as those described in U.S. Letters Patent 3,281,383 to R. P. Zelinski and Henry L. Hsieh, issued Oct. 25, 1966, can be employed. Or, carbon monoxide can be employed according to the process taught in U.S. Letters Patent 3,427,364, issued Feb. 11, 1969, to Alfred W. Shaw, Charles H. Wilcoxen, Jr., and Frank D. Mango. Carbon dioxide can be employed, as can other coupling or terminating agents known to the art.

Treating agents particularly useful are those containing at least three reactive sites. These agents include polyepoxides, polyisocyanates, polyamines, polyaldehydes, polyketones, polyanhydrides, polyesters, polyhalides, one or more, mixtures of two or more, or coupling agents with two or more different functional groups also can be employed. Such treating agents are well described in the aforementioned referenced patents.

The amount of treating agent used can be any broad range known to the art, such as from 0.1 to 1.5 equivalents of treating agent per equivalent of lithium present in the polymer. The optimal amount for maximum branching presently is considered to be one equivalent of treating agent. Larger amounts can be employed, if desired, since such usage tends to encourage the production of polymers containing terminally reactive groups, or encourages coupling only to the extent of linear polymer rather than branched polymer. Lower molecular weight linear polymer also can be produced in conjunction with higher molecular weight branched polymer when the amount of treating agent employed is insufficient to provide maximum branching.

The treating agents, where employed, are added to the unquenched polymerization reaction mixture, prior to the addition of any other material such as water, acid, alcohol, or other material tending to inactivate or remove active lithium atoms present in the unquenched polymer. The temperature of the coupling reaction can vary over a broad range, and conveniently is that used for the polymerization itself.

POLYMER RECOVERY

The polymerization reaction can be finally terminated preparatory for recovery of the polymer by treatment with materials containing active hydrogen including various alcohols, acids, or mixtures of such reagents, all as known in the art.

Recovery of the polymer from the polymerization reaction system can be accomplished by coagulation of the mixture with a nonsolvent, by steam stripping or evaporation of the diluent, or the like. Frequently, an antioxidant is added to the polymer during or just prior to recovery steps for polymer stabilization.

EXAMPLES

The examples following demonstrate the use of modifiers according to the process of my invention. The examples, specific reactants used therein, relationships and proportions, are intended to be illustrative of my invention, and not limitative of the reasonable scope thereof.

EXAMPLE I

Runs were made according to the polymerization recipe shown below. These runs employed lithium allyloxide as the modifier according to my invention.

POLYMERIZATION RECIPE

| | |
|---|---|
| Cyclohexane, parts by wt. | 780 |
| 1,3-butadiene, parts by wt. | 100 |
| n-Butyllithium, meqhm. | 1.0 |
| Lithium allyloxide, mhm.[1] | variable |
| Tetrahydrofuran (THF), parts by wt. | 1.5 |
| Temperature, ° C. | 70 |
| Time, hours | 2 |

[1] Mhm.=gram millimoles per 100 g. of monomer(s).

Charge order: Cyclohexane, $N_2$ purge, 1,3-butadiene, lithium allyloxide or allyl alcohol, n-butyllithium.

Each run was terminated by the addition of a 10 weight percent solution of an antioxidant, 2,2'-methylene-bis(4-methyl-6-tert-butylphenol) in a 50/50 by volume mixture of isopropyl alcohol/toluene with the amount added being sufficient to provide about 1 part by weight of the antioxidant per 100 parts by weight of polymer. Each mixture then was coagulated with isopropyl alcohol and the polymer separated and dried.

Properties of polymers prepared by the process of my invention are shown in Table I.

TABLE I

| Run number | Li-allyl-oxide, mhm. | Conversion, percent | Inherent viscosity [1] | H.I.[2] |
|---|---|---|---|---|
| 1 | 0 | 100 | 1.77 | 1.21 |
| 2 | 0.40 | 100 | 1.67 | 1.25 |
| 3 | 0.54 | 100 | 1.84 | 1.35 |
| 4 | 0.80 | 100 | 1.73 | 1.47 |
| 5 | 1.60 | 91 | 1.85 | 2.20 |
| 6 | [3] 0.40 | 100 | 1.82 | 1.25 |
| 7 | [3] 0.54 | 100 | 1.73 | 1.31 |
| 8 | [3] 0.80 | 100 | 2.05 | 1.61 |

[1] Determined according to the procedure of U.S. Patent 3,278,508, column 20, notes a and b.
[2] Heterogeneity index defined as the ratio of weight average molecular weight ($M_w$) to the number average molecular weight ($M_n$) as determined by a calibrated gel permeation chromatography instrument.
[3] Lithium allyloxide modifier formed in situ by the addition of allyl alcohol to the polymerization reaction mixture.

The results shown in Table I demonstrate the broadened molecular weight distribution achieved by the addition of a lithium alkenoxide to the polymerization reaction mixture.

EXAMPLE II

Further runs were conducted according to the recipe and procedures of Example I, except that the organolithium initiator employed was a multilithium initiator prepared by the reaction of divinylbenzene with sec-butyllithium at a 0.25:1 molar ratio. The results of these runs are shown in Table II.

TABLE II

| Run number | Li-allyl-oxide, mhm. | Conversion, percent | Inherent viscosity | H.I. |
|---|---|---|---|---|
| 9 | 0 | 100 | 2.14 | 1.29 |
| 10 | 0.80 | 100 | 2.48 | 1.84 |
| 11 | [1] 0.80 | 100 | 2.46 | 1.72 |

[1] Formed in situ.

The results of Table II again demonstrate the broadened molecular weight distribution achieved by the instant invention.

EXAMPLE III

Other runs were conducted in which butadiene/styrene 75/25 random copolymers were prepared with a multi-lithium initiator employing a 0.3:1 molar ratio of divinylbenzene to sec-butyllithium, in the presence of lithium allyloxide modifier, and then terminated with silicon tetrachloride $SiCl_4$ as branching agent.

POLYMERIZATION RECIPE

| | |
|---|---|
| Cyclohexane, parts by wt. | 550 |
| 1,3-butadient, parts by wt. | 75 |
| Styrene, parts by wt. | 25 |
| Initiator (multi Li), meqhm. | 1.4 |
| Lithium allyloxide, mhm. | Variable |
| Tetrahydrofuran (THF), parts by wt. | 1.5 |
| Temperature, ° C. | 70 |
| Time, hours | 1 |
| Termination reaction: | |
| Silicon tetrachloride $SiCl_4$ | Variable |
| Temperature, ° C. | 70 |
| Time, hours | 1 |

Charge order: Cyclohexane, $N_2$ purge, 1,3-butadiene, styrene, THF, lithium allyloxide, initiator, time, $SiCl_4$, time.

The polymerization results are shown in Table III.

TABLE III

| Run number | Lithium allyl-oxide, mhm. | $SiCl_4$, mhm. | Conversion, percent | Inherent viscosity | H.I. |
|---|---|---|---|---|---|
| 12 | 0 | 0 | 97 | 1.74 | 1.4 |
| 13 | 0 | 0.24 | 97 | [1] 3.19 | 3.3 |
| 14 | 3.3 | 0 | 85 | 1.74 | 2.2 |
| 15 | 3.3 | 0.12 | 93 | 1.90 | 2.5 |
| 16 | 3.3 | 0.24 | 92 | 2.07 | 2.6 |

[1] Polymer contained 7% gel.

The results in Table III demonstrate that the use of $SiCl_4$ to terminate or branch polymers made with a multi-lithium initiator in the presence of lithium allyloxide modifier provided gel-free polymers of broadened molecular weight distribution. This presently is a preferred embodiment of my invention, i.e., gel-free polymers from multi-lithium initiator and $SiCl_4$ termination.

EXAMPLE IV

Additional runs were conducted in which 1,3-butadiene was polymerized with n-butyllithium in the presence of lithium allyloxide formed in situ by the addition of allyl alcohol to the polymerization reaction mixture. Carbon monoxide CO then was empoyed as the terminating agent for the polymerization reactions.

POLYMERIZATION RECIPE

| | |
|---|---|
| Cyclohexane, parts by wt. | 780 |
| 1,3-butadiene, part by wt. | 100 |
| n-Butyllithium, mhm. | [1] 1.0 |
| Allyl alcohol, mhm. | Variable |
| Temperature, ° C. | 70 |
| Time, hours | 1.5 |
| Termination reaction: | |
| Carbon monoxide (CO) | Variable |
| Temperature, ° C. | 70 |
| Time, hours | 0.5 |

[1] This number represents the amount in excess of that required to react in a 1:1 stoichiometry with the allyl alcohol added for in situ modifier preparation.

Charge order: Cyclohexane, $N_2$ purge, 1,3-butadiene, allyl alcohol, n-butyllithium, time, carbon monoxide, time.

The polymerization results are shown in Table IV.

TABLE IV

| Run No. | Allyl-OH, mhm. | CO, phm. | Conversion, percent | Inherent viscosity | H.I. | Cold flow, mg./min.[1] |
|---|---|---|---|---|---|---|
| 17 | 0 | 0 | 100 | 1.53 | 1.2 | 87.0 |
| 18 | 1.0 | 0 | 99 | 2.42 | 1.5 | 14.0 |
| 19 | 1.0 | 0.01 | 100 | 3.00 | 1.8 | 2.5 |
| 20 | 1.0 | 0.03 | 100 | 2.80 | 1.9 | 1.1 |
| 21 | 1.0 | 0.08 | 98 | 3.40 | 2.1 | 0.0 |

[1] Cold flow measured by extruding polymer through a ¼ inch orifice at 3.5 p.s.i. pressure and a temperature of 50° C. After allowing 10 minutes to reach steady state, the rate of extrusion is measured and reported in milligrams per minute.

The results in Table IV demonstrate that carbon monoxide termination of polymerizations carried out in the presence of lithium allyloxide modifier according to this invention provides polymers of broadened molecular weight distribution and reduced cold flow.

Polymers prepared according to the process of my invention can be employed in any variety of applications using synthetic or natural rubbers, such as in automobile tires, gaskets, tubing, belting, shoe soles, adhesives, sealants, and the like, and including any vulcanizable compounding recipe to provide molded rubber articles, etc. Formulations for general utility can incorporate carbon black or other reinforcing agents, various fillers, antioxidants, curatives, pigments, extender oils, or plasticizers. The polymer can be employed in admixture with other polymers, rubbery or plastic in nature, depending on the final use intended, all as are known in the rubber compounding arts.

My description, including examples, have shown the beneficial results obtained from the modified polymerization process according to my invention, using the modifiers as described. Variations and modifications of my invention can be made, as will be apparent to one skilled in the art, yet without parting from the intended scope and spirit of my disclosure including the claims as here appended.

I claim:

1. In a process for the polymerization of at least one polymerizable monomer polymerizable with an organolithium initiator under polymerization conditions, wherein said monomer comprises a conjugated diene, monovinyl-substituted aromatic compound, or both, the improvement which comprises the addition of a lithium alkenoxide modifier to the polymerization reaction system prior to polymerization of all monomer present, wherein is employed a ratio of equivalents of lithium in said organolithium initiator to equivalents of said lithium alkenoxide effective to broaden molecular weight distribution, wherein said lithium alkenoxide modifier can be represented by

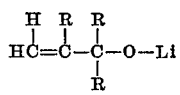

wherein each R is hydrogen or a hydrocarbyl radical containing from 1 to 8 carbon atoms and is alkyl, cycloalkyl, aryl, or combination thereof.

2. The process according to claim 1 wherein said lithium alkenoxide modifier is charged to said polymerization reaction at least one of prior to initiation thereof, prior to substantial completion of said polymerization reaction, or is formed in situ in said polymerization reaction system.

3. The process according to claim 3 wherein said modifier is added to said polymerization reaction system or formed in said polymerization reaction system at least one of incrementally and substantially continuously during at least a portion of the course of said polymerization.

4. The process according to claim 2 wherein said conjugated diene contains 4 to 12 carbon atoms per molecule, and said monovinyl-substituted aromatic compound contains 8 to 20 carbon atoms per molecule.

5. The process according to claim 4 wherein said organolithium initiator is employed in said polymerization reaction in an amount sufficient to provide about 1 to 20 gram milliequivalents of lithium per 100 grams of polymerizable monomer employed, and said lithium alkenoxide modifier is employed in an amount sufficient to provide about 0.1 to 2 gram milliequivalents of lithium in said initiator per equivalent of said lithium alkenoxide.

6. The process according to claim 5 wherein said polymerization reaction is conducted at a temperature of about $-50°$ C. to $+200°$ C., under pressure sufficient to maintain at least a portion of the polymerization reaction mixture in a substantial liquid phase.

7. The process according to claim 6 wherein said polymerization reaction is carried out in the presence of a diluent selected from hydrocarbons containing from 4 to 12 carbon atoms per molecule, one or more thereof, or mixtures thereof.

8. The process according to claim 4 wherein said organolithium initiator can be represented by $R'(Li)_x$ wherein $R'$ is an aliphatic, cycloaliphatic, aromatic, or combination thereof, radical, and $x$ is an integer of 1 to 4.

9. The process according to claim 8 wherein said polymerizable monomer is 1,3-butadiene, said organolithium initiator is n-butyllithium, and said modifier is lithium allyloxide.

10. The process according to claim 9 wherein said lithium allyloxide modifier is formed in situ.

11. The process according to claim 8 wherein said polymerizable monomer is 1,3-butadiene and styrene, said organolithium initiator is a multilithium initiator prepared from sec-butyllithium and divinylbenzene, and said modifier is lithium allyloxide.

12. The process according to claim 5 wherein said modified polymerization system further is treated, while said polymerization reaction is unquenched, with a treating agent which is a polyepoxide, polyisocyanate, polyamine, polyaldehyde, polyketone, polyanhydride, polyester, polyhalide, carbon monoxide, or carbon dioxide.

13. The process according to claim 12 wherein said polymerizable monomer is butadiene, said organolithium initiator is n-butyllithium, said modifier is lithium allyloxide, and said treating agent is carbon monoxide.

14. The process according to claim 12 wherein said polymerizable monomer is butadiene and styrene, said organolithium initiator is a multilithium initiator prepared from sec-butyllithium and divinylbenzene, said modifier is lithium allyloxide, and said treating agent is silicon tetrahalide.

References Cited

UNITED STATES PATENTS

| | | | |
|---|---|---|---|
| 2,856,391 | 10/1958 | Diem | 260—94.2 T |
| 3,294,768 | 12/1966 | Wofford | 260—94.2 |
| 3,331,826 | 7/1967 | Talcott | 260—94.2 |
| 3,280,084 | 10/1966 | Zelinski | 260—880 |

OTHER REFERENCES

Hsieh: Effect of Lithium Alkoxide and Hydroxide on Polymerization Initiated With Alkyl Lithium," Journal of Polymer Science, Part A-1, 8, pp. 533-543 (1970).

JAMES A. SEIDLECK, Primary Examiner

U.S. Cl. X.R.

260—85.1, 94.2 T, 94.7 R, 94.7 HA